(12) United States Patent
Hall et al.

(10) Patent No.: US 11,208,346 B2
(45) Date of Patent: Dec. 28, 2021

(54) PROCESSES OF MAKING GLASS WITH TEXTURED SURFACE AND 3-D SHAPE

(71) Applicant: CORNING INCORPORATED, Corning, NY (US)

(72) Inventors: Jill Marie Hall, Campbell, NY (US); Yuhui Jin, Painted Post, NY (US); Timothy James Kiczenski, Corning, NY (US); John Richard Ridge, Hammondsport, NY (US); Ljerka Ukrainczyk, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 856 days.

(21) Appl. No.: 15/813,882

(22) Filed: Nov. 15, 2017

(65) Prior Publication Data

US 2018/0134614 A1 May 17, 2018

Related U.S. Application Data

(60) Provisional application No. 62/422,300, filed on Nov. 15, 2016.

(51) Int. Cl.
| | |
|---|---|
| *C03C 15/00* | (2006.01) |
| *C03B 23/02* | (2006.01) |
| *C03B 23/035* | (2006.01) |
| *C03C 21/00* | (2006.01) |
| *C03C 3/097* | (2006.01) |

(52) U.S. Cl.
CPC .............. *C03C 15/00* (2013.01); *C03B 23/02* (2013.01); *C03B 23/0357* (2013.01); *C03C 3/097* (2013.01); *C03C 21/002* (2013.01); *Y02P 40/57* (2015.11)

(58) Field of Classification Search
CPC .............. C03B 23/0013; C03B 23/002; C03B 23/0026; C03B 23/02–037; C03B 23/0357; C03C 19/00
See application file for complete search history.

(56) References Cited

U.S. PATENT DOCUMENTS

| | | | |
|---|---|---|---|
| 3,753,840 A | 8/1973 | Plumat | |
| 5,099,171 A * | 3/1992 | Daiku | H01J 29/861 313/479 |

(Continued)

FOREIGN PATENT DOCUMENTS

| | | |
|---|---|---|
| CN | 101309873 A | 11/2008 |
| CN | 103979798 A | 8/2014 |

(Continued)

OTHER PUBLICATIONS

International Search Report and Written Opinion PCT/US2017/061721 dated Feb. 23, 2018.

(Continued)

*Primary Examiner* — Erin Snelting
(74) *Attorney, Agent, or Firm* — John P. McGroarty

(57) ABSTRACT

A process for forming a textured 3-D glass-based substrate includes texturing a first surface of a glass-based substrate and shaping the glass-based substrate into a three-dimensional shape. The surface profile of the substrate is non-planar. In some embodiments, texturing the first surface of the glass-based substrate provides the first surface with an average roughness of 10 nm to 2000 nm.

21 Claims, 14 Drawing Sheets

(56) References Cited

U.S. PATENT DOCUMENTS

| | | | |
|---|---|---|---|
| 8,429,937 B2* | 4/2013 | Malach | C03B 23/0252 65/104 |
| 8,713,968 B2* | 5/2014 | Keebler | B24B 9/10 65/106 |
| 9,010,153 B2* | 4/2015 | Ukrainczyk | C03B 23/0235 65/104 |
| 2005/0078391 A1* | 4/2005 | Faris | B08B 17/06 359/894 |
| 2008/0308146 A1 | 12/2008 | Krasnov et al. | |
| 2009/0127727 A1* | 5/2009 | Matsushima | C03B 23/0258 264/1.7 |
| 2009/0162623 A1* | 6/2009 | Foresti | B29C 59/046 428/210 |
| 2012/0058303 A1 | 3/2012 | Gabel et al. | |
| 2013/0142994 A1* | 6/2013 | Wang | C03C 17/256 428/141 |
| 2013/0323444 A1* | 12/2013 | Ehemann | C03C 4/18 428/34.4 |
| 2016/0031736 A1* | 2/2016 | Muehlke | C03B 23/0013 428/172 |
| 2016/0107928 A1 | 4/2016 | Bayne et al. | |
| 2016/0137550 A1* | 5/2016 | Murata | C03B 23/03 428/141 |
| 2016/0272530 A1* | 9/2016 | Hall | C03B 23/0357 |
| 2016/0280576 A1 | 9/2016 | Hong et al. | |
| 2017/0205541 A1 | 7/2017 | Amin et al. | |
| 2019/0022979 A1* | 1/2019 | Luzzato | B32B 17/06 |

FOREIGN PATENT DOCUMENTS

| | | |
|---|---|---|
| CN | 104661976 A | 5/2015 |
| JP | 2010-070445 A | 4/2010 |
| JP | 2016-526003 A | 9/2016 |
| WO | 2003095234 A2 | 11/2003 |
| WO | 2007/058352 A1 | 5/2007 |
| WO | 2007/063735 A1 | 6/2007 |
| WO | 2016/028660 A1 | 2/2016 |

OTHER PUBLICATIONS

Harris et al; "Systems and Methods for Ion Exchanging Glass Articles"; Filed Nov. 28, 2017 as U.S. Appl. No. 15/824,582; 61 Pages.

Taiwanese Patent Application No. 106139079, Office Action dated Mar. 11, 2021, 5 page (English Translation Only) Taiwanese Patent Office.

Chinese Patent Application No. 201780070692, Office Action dated May 18, 2021; 10 pages (English Translation only); Chinese Patent Office.

Japanese Patent Application No. 2019-525828, Office Action dated Oct. 28, 2021, 09 pages (5 pages of English Translation and 4 pages of Original Document), Japanese Patent Office.

* cited by examiner

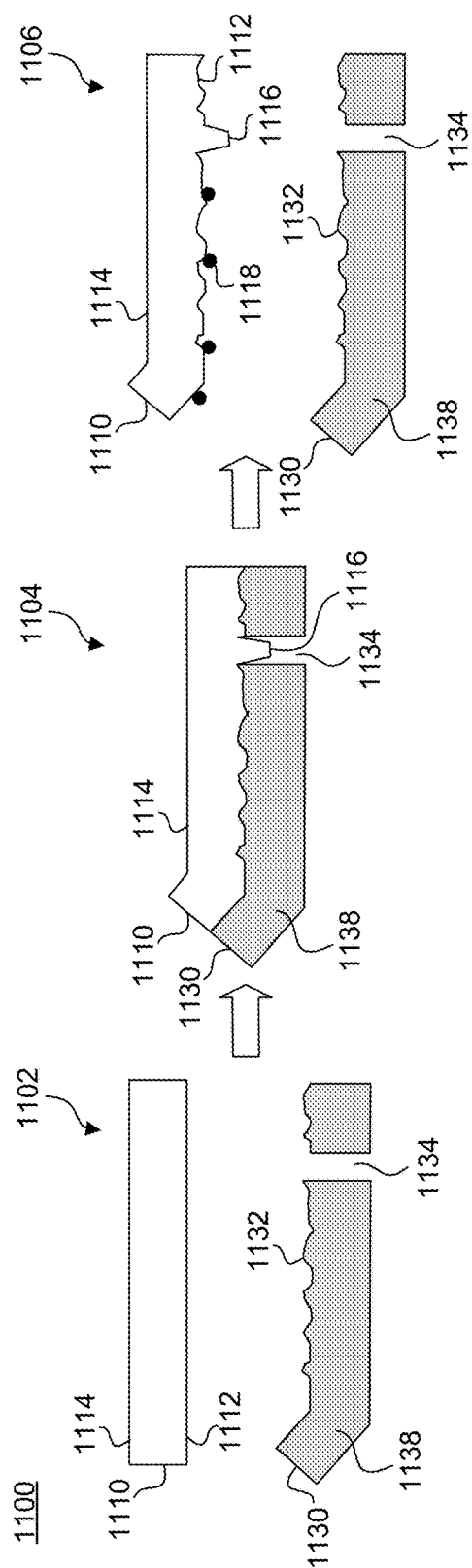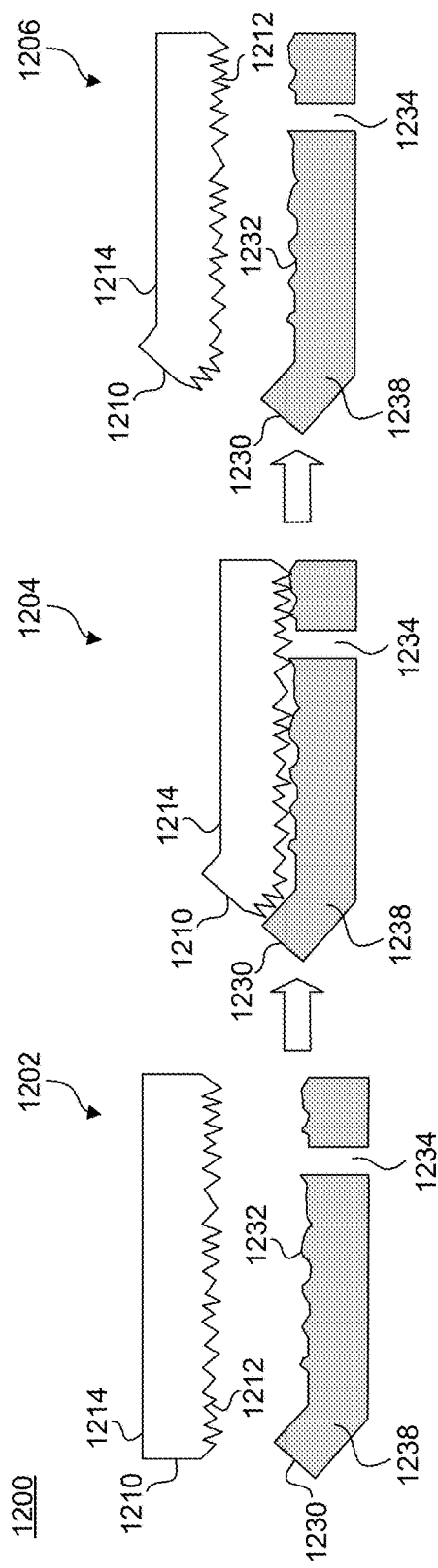

PROCESSES OF MAKING GLASS WITH TEXTURED SURFACE AND 3-D SHAPE

This application claims the benefit of priority under 35 U.S.C. § 119 of U.S. Provisional Application Ser. No. 62/422,300 filed on Nov. 15, 2016, the content of which is relied upon and incorporated herein by reference in its entirety.

BACKGROUND

Field

The present disclosure relates to a glass-based substrate having a textured surface and three-dimensional ("3-D") shape and to processes of making glass having a textured surface and 3-D shape.

Background

One goal and challenge for the glass industry is to design and fabricate glass that has both functionality and beauty. For example, there is a demand in the consumer electronic market for glasses with multiple advantageous properties, such as 3-D shape, anti-glare surface, elegant appearance, and tactile feel.

Technologies have been developed for making glass with either 3-D or anti-glare features (e.g., matte finish). But glass having both 3-D and anti-glare features and the corresponding processes of making it have not yet been developed. Such glass would be advantageous, for example, as a cover of an electronic device.

BRIEF SUMMARY

In a first aspect a process can include texturing a first surface of a glass-based substrate to create a textured first surface; and shaping the glass-based substrate into a three-dimensional shape, wherein the textured first surface can face a mold surface during shaping and a surface profile of the substrate can be non-planar after shaping.

In a second aspect according to the first aspect, wherein texturing the first surface of the glass-based substrate can provide the first surface with an average surface roughness (Ra) of 10 nm to 2000 nm.

In a third aspect according to the first or second aspect, wherein texturing the first surface of the glass-based substrate can provide the first surface with an average surface roughness (Ra) of 200 nm to 2000 nm.

In a fourth aspect according to any one of the preceding aspects, the process also includes tempering the glass-based substrate after texturing and shaping the glass-based substrate.

In a fifth aspect according to the fourth aspect, wherein the tempering can be chemical or thermal tempering.

In a sixth aspect according to any one of the preceding aspects, wherein texturing the first surface of the glass-based substrate can include etching the first surface of the glass-based substrate.

In a seventh aspect according to any one of the preceding aspects, wherein shaping the glass-based substrate into the three-dimensional shape can include vacuum-forming the glass-based substrate on a mold.

In an eighth aspect according to any one of the preceding aspects, the process can also include cutting the glass-based substrate to provide one or more substrate portions having an area smaller than the glass-based substrate.

In a ninth aspect according to the eighth aspect, the cutting can be performed after texturing the first surface of the glass-based substrate and before shaping the glass-based substrate into the three-dimensional shape.

In a tenth aspect according to any one of the preceding aspects, the three-dimensional shape can include a curve in at least one direction.

In an eleventh aspect according to any one of the preceding aspects, wherein when the non-planar glass-based substrate is at rest on a flat surface, at least a portion of the glass-based substrate can be elevated above the flat surface by a distance of at least 1 times the maximum thickness of the glass-based substrate.

In a twelfth aspect according to any one of the preceding aspects, the process can also include texturing a second surface of the glass-based substrate.

In a thirteenth aspect according to any one of the preceding aspects, wherein the glass-based substrate can be glass.

In a fourteenth aspect according to any one of the preceding aspects, wherein the glass-based substrate can be glass-ceramic.

In a fifteenth aspect, a product can include a glass-based substrate having a first composition; a textured first surface; and a three-dimensional shape, wherein a surface profile of the glass-based substrate can be non-planar and a ring-on-ring failure load of the glass-based substrate as determined by The Ring-on-Ring Test can be within ten percent of the ring-on-ring failure load of a flat glass-based substrate having the first composition and the textured first surface.

In a sixteenth aspect according to the fifteenth aspect, wherein the glass-based substrate is tempered glass-based substrate.

In a seventeenth aspect according to the fifteenth or sixteenth aspect, wherein an average surface roughness (Ra) of the textured first surface can be 10 nm to 2000 nm.

In an eighteenth aspect according to any one of the fifteenth through seventeenth aspects, wherein an average surface roughness (Ra) of the textured first surface can be 200 nm to 2000 nm.

In a nineteenth aspect according to any one of the fifteenth through eighteenth aspects, wherein the product can be an electronic device and wherein the electronic device can include a housing having a front surface, a back surface, and side surfaces, and electrical components provided at least partially within the housing, wherein the electrical components can include at least a controller, a memory, and a display, and wherein the display can be provided at or adjacent the front surface of the housing.

In a twentieth aspect according to the nineteenth aspect, wherein the front surface of the housing of the electronic device can include the glass-based substrate.

In a twenty-first aspect according to the nineteenth or twentieth aspect, wherein the back surface of the housing of the electronic device can include the glass-based substrate.

In a twenty-second aspect according to any one of the nineteenth through twenty-first aspect, wherein the electronic device further can include a cover substrate disposed over the display and the cover substrate can include the glass-based substrate.

In a twenty-third aspect according to any one of the fifteenth through twenty-second aspects, wherein the glass-based substrate can be glass.

In a twenty-fourth aspect according to any one of the fifteenth through twenty-third aspects, wherein the glass-based substrate can be glass-ceramic.

BRIEF DESCRIPTION OF THE DRAWINGS/FIGURES

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

FIG. 11 illustrates a process of molding 3-D glass having a non-textured surface, according to an embodiment.

FIG. 12 illustrates a process of molding 3-D glass having a textured surface, according to an embodiment.

DETAILED DESCRIPTION

Figure 1B:
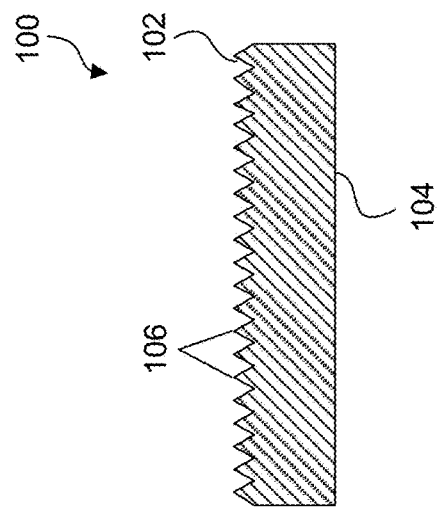
FIG. 1B illustrates a cross-section of a flat substrate, according to some embodiments.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The products disclosed herein, and the processes for making them, include glass-based substrates having a 3-D shape and a textured surface. As used herein the term "glass-based" refers to both glasses and glass-ceramics. These glass-based substrates provide a pleasing aesthetic appearance, tactile feel, and anti-glare functionality. The textured surface improves the 3-D molding process by reducing contamination introduced from the mold, improves surface uniformity, and increases the ease with which parts are separated from the mold. Accordingly, the processes by which these glass-based substrates are made improve the product yield and therefore reduce production costs.

A textured glass-based surface can effectively reduce the surface gloss and reflection, and improve the tactile feel of the surface. A textured surface can include a plurality of features on the surface that are light-scattering and/or create a roughness to the surface. Both the 3-D shape and the surface texture can improve the aesthetic appearance of the substrate (i.e., the glass). Glass and glass-ceramic with a textured surface and 3-D shape can be employed in many applications. For example, a 3-D glass or glass-ceramic having a textured surface with low surface roughness (and low transmission haze and low sparkle) can be used as the front cover for an electronic display. In some embodiments, a low surface roughness Ra is 200 nm or less. In some embodiments, a low transmission haze is 15% or less. And, for example, a 3-D glass or glass-ceramic having a textured surface with high surface roughness (and high transmission haze) can be used as the back cover for an electronic device. In some embodiments, a high surface roughness Ra is above 200 nm. In some embodiments, a high transmission haze is above 15%.

The terms "3-D shape" or "3-D substrate" (with or without the modifier "textured") as used herein is defined as having a surface profile that is non-planar. In some embodiments, 3-D substrate is glass or glass-ceramic having any curvature. In some embodiments, the 3-D substrate, when placed as flat as possible on a flat surface, in the absence of external force, has at least some portion elevated above the surface, as shown, for example, in FIGS. 18A-D. In some embodiments, 3-D substrate is defined as glass or glass-ceramic having a shaped portion that deviates by more than 0.1 mm from the flat plane. For consumer electronics cover glass, the 3-D substrate, in some embodiments, can have a shape that has a flat area or slightly curved area (e.g., a radius of curvature less than about 400 mm). In some embodiments, the 3-D substrate can, in addition, have one or more bends with a smaller radius of curvature, for example, near the edges to create a wrap-around design look (see, for example, U.S. Pat. Nos. 8,429,937, 8,713,968, and 9,010,153, which are incorporated by reference herein in their entireties). In some embodiments, the 3-D substrate is elevated above the surface by a distance at least 0.1, 0.2, 0.5, 1, 1.5, 2, 2.5, 3, 5, 10, 15, or 20 times the maximum thickness of the glass, or within any range having any two of these values as endpoints.

Figure 1A:
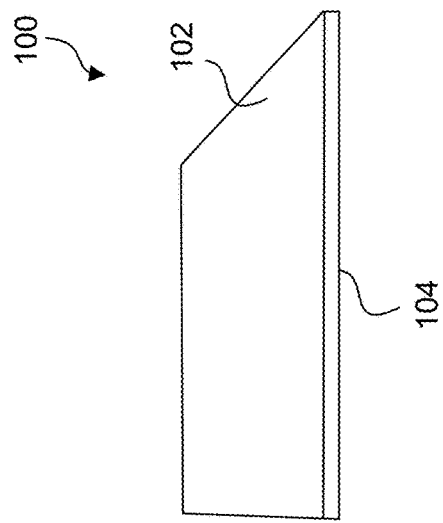
FIG. 1A illustrates a perspective view of a flat substrate, according to some embodiments.

FIG. 1A illustrates flat substrate 100, according to an embodiment. In some embodiments, flat substrate 100 can have a textured surface 102 and a non-textured surface 104.

In some embodiments, both surfaces can be textured. FIG. 1B illustrates a cross-sectional view of flat substrate 100, according to an embodiment. FIG. 1B shows, schematically, surface features 106 of textured surface 102. Processes (e.g., etching) for forming surface features 106 are described in detail below.

Figure 2B:
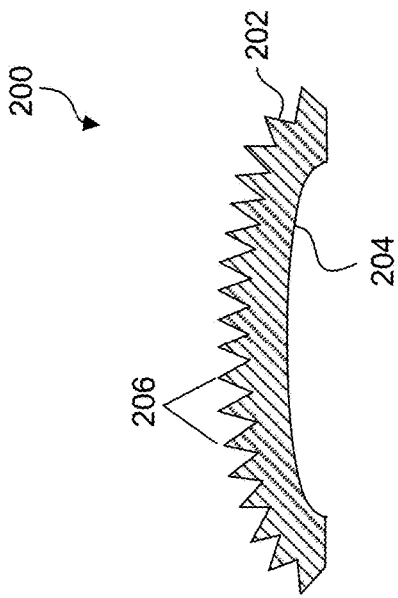
FIG. 2B illustrates a cross-section of a curved substrate, according to some embodiments.
Figure 2A:
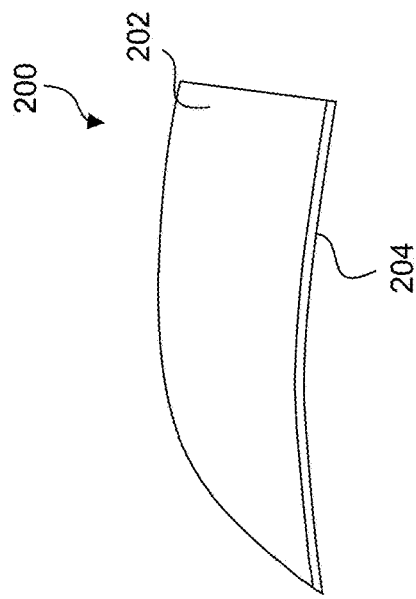
FIG. 2A illustrates a perspective view of a curved substrate, according to some embodiments.

FIG. 2A illustrates curved substrate 200, according to an embodiment. In some embodiments, curved substrate 200 can include textured surface 202 and non-textured surface 204. In some embodiments, both surfaces can be textured. Curved substrate 200 is an example of a 3-D textured glass substrate. FIG. 2B illustrates a cross-section of curved substrate 200, according to an embodiment. As shown in the schematic of FIG. 2B, textured surface 202 can include surface features 206. In some embodiments, curved substrate 200 can be made by 3-D forming a flat textured substrate, for example, flat substrate 100.

Figure 3A:
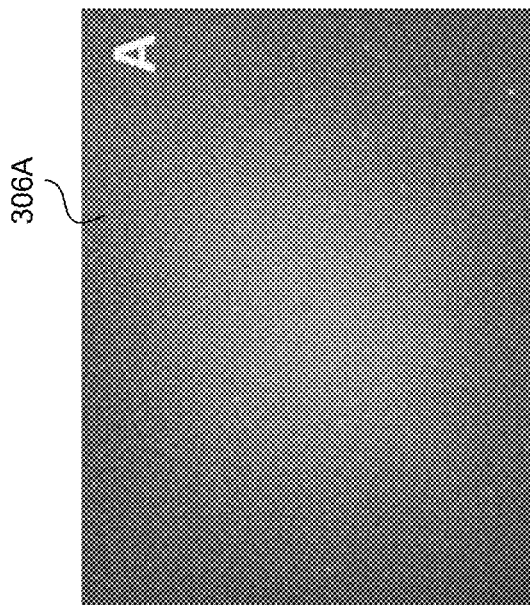
FIGS. 3A-3C illustrate optical microscope images of surface features of textured substrates, according to embodiments.
Figure 3B:
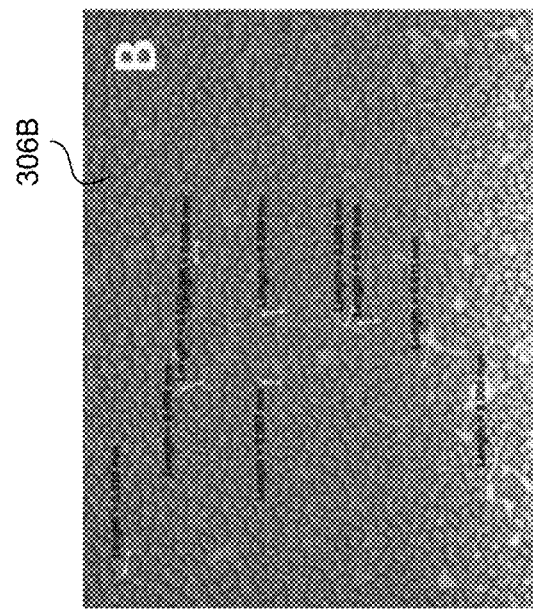
Figure 3C:
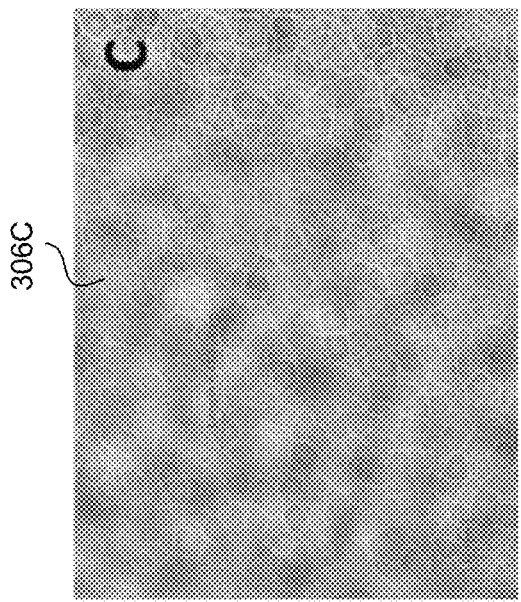

FIGS. 3A-3C show embodiments of textured surfaces of glass substrates under an optical microscope. As shown in FIGS. 3A-3C, the surface features 306 are progressively larger from the image in FIG. 3A through the image in FIG. 3C. More specifically, FIG. 3A shows a 500× dark field optical microscope image of a textured surface having surface features 306A with a longest cross-sectional dimension of sub-micron sizes. FIG. 3B shows a 500× bright field optical microscope image of a textured surface having surface features 306B with a longest cross-sectional dimension of about 10 µm in size. And FIG. 3C shows a 200× bright field optical microscope image of a textured surface having surface features 306C with a longest cross-sectional dimension of more than about 10 µm in size, for example, over about 40 µm in size. Other surface feature sizes can also be achieved using the processes described herein. These surface features can provide different levels of average surface roughness (Ra), for example, from less than 100 nm Ra to over 1000 nm Ra. For example, in some embodiments, Ra is between about 10 nm and 2500 nm. In some embodiments, Ra is between about 20 nm and 2000 nm. In some embodiments, Ra is between about 300 nm and 2000 nm. The average surface roughness may also be within any range having any two of these values as endpoints. The average surface roughness Ra is defined as the arithmetic average of the absolute values of the roughness profile (i.e., differences between the local surface heights and the average surface height) and can be described by the following equation:

$$R_a = \frac{1}{L}\int_L^0 |z(x)|dx.$$

The average surface roughness Ra may be measured using an optical surface profiler, such as the 7300 Optical Surface Profiler available from Zygo® Corporation. The average surface roughness Ra as described herein is measured, for a 50 mm by 50 mm sample, by taking the average of four measurements over a sample surface section having dimensions of about 0.26 mm by 0.35 mm.

Figure 4B:
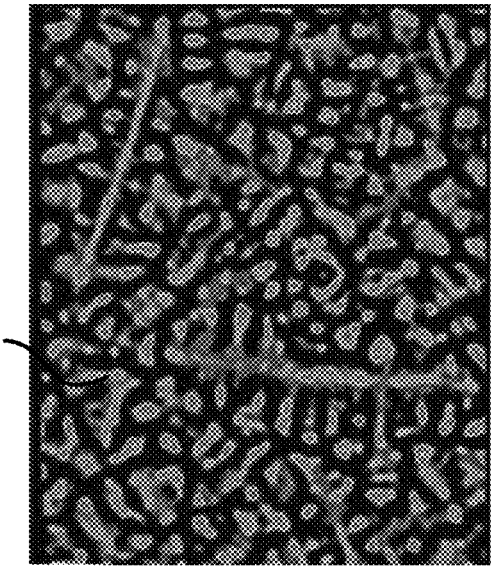
FIGS. 4A and 4B illustrate surface images of textured glass before and after 3-D forming, respectively, according to embodiments.
Figure 5B:
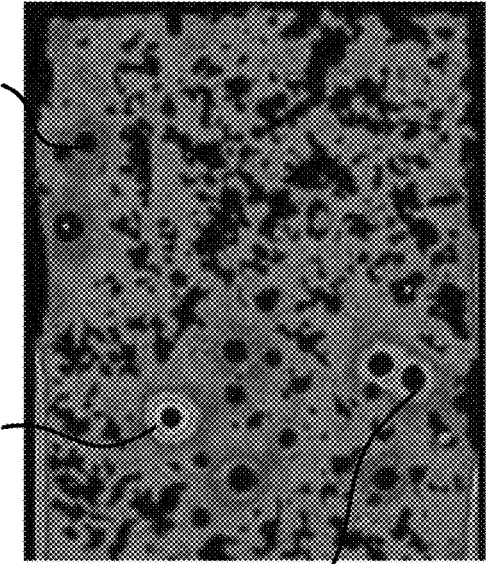
FIGS. 5A and 5B illustrate surface images of non-textured glass before and after 3-D forming, respectively, according to embodiments.
Figure 4A:
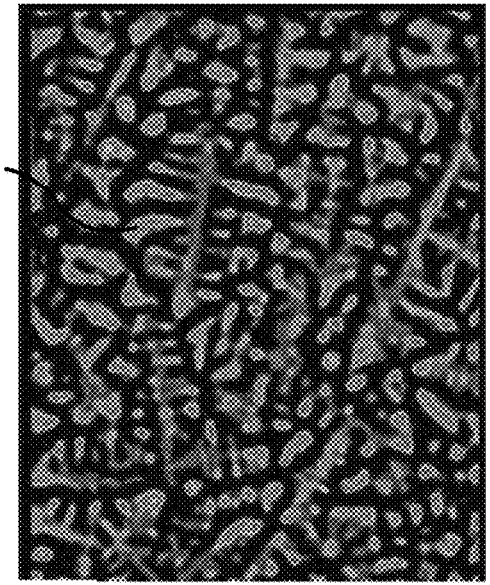
Figure 5A:
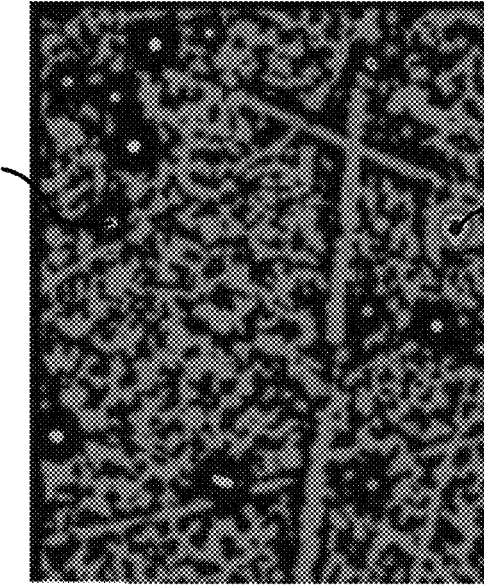

FIGS. 4A and 4B illustrate Zygo® 7300 Optical Surface Profiler images of a glass substrate before and after a 3-D forming process for a textured glass substrate, respectively. FIGS. 5A and 5B illustrate Zygo® 7300 Optical Surface Profiler images of a non-textured glass before and after a 3-D forming process, respectively. As can be seen by comparing FIGS. 4A and 4B, the surface of the textured glass substrate has surface features 406 of various sizes disposed across the majority of the substrate surface in both the before and after images of the 3-D forming process. In contrast, FIG. 5A shows that surface features 506 are irregular across the surface of the non-textured glass prior to 3-D forming. And after 3-D forming, as shown in FIG. 5B, further irregularities are shown in the surface features 506. These images show that the textured surface of the glass substrate in FIGS. 4A and 4B helps prevent surface irregularities from being created during the 3-D forming process.

Figure 6B:
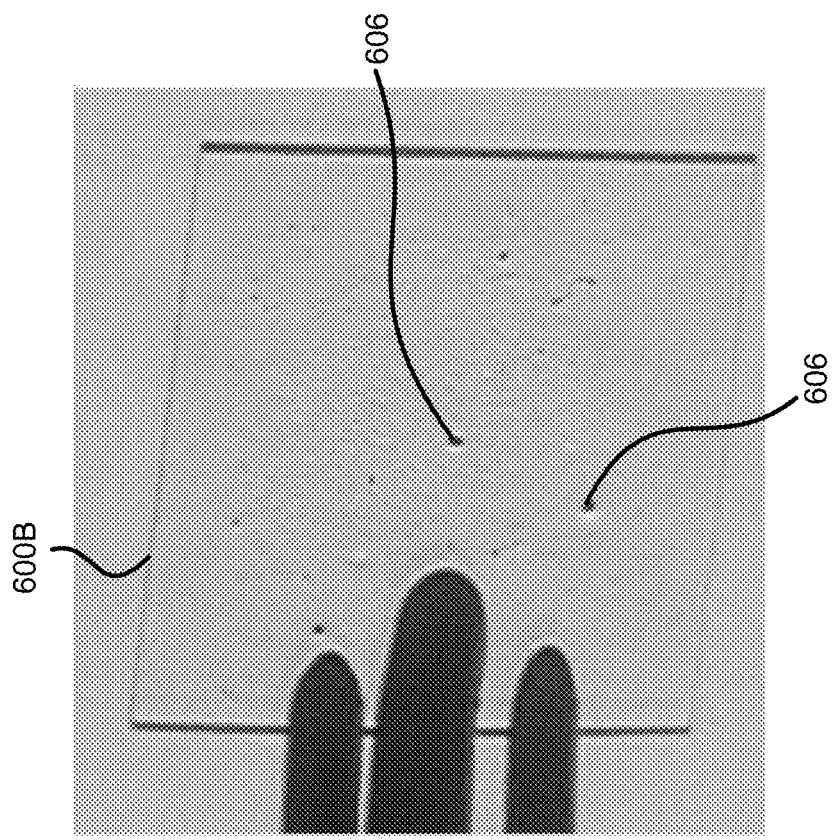
FIG. 6B illustrates a shadowgraph of a non-textured 3-D glass.
Figure 6A:
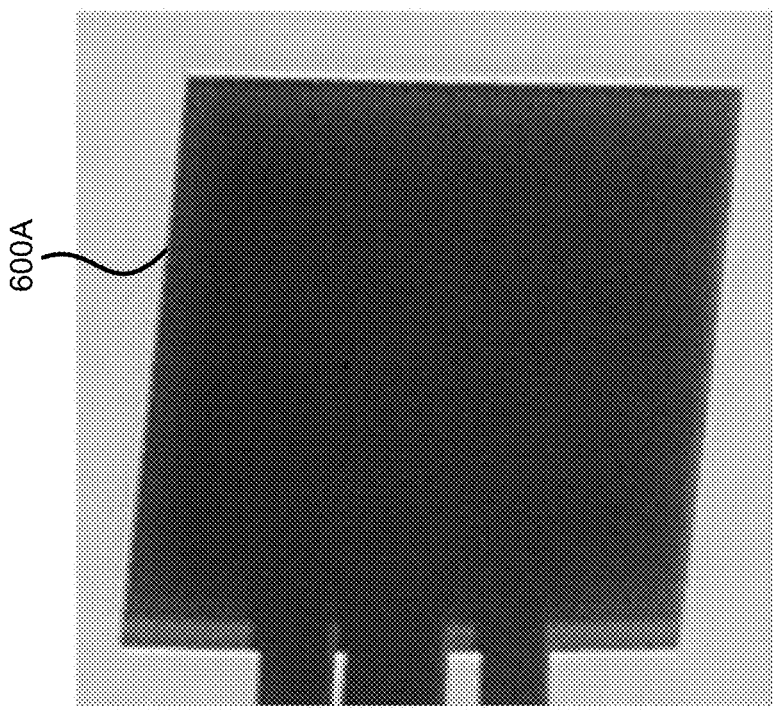
FIG. 6A illustrates a shadowgraph of a 3-D textured glass, according to an embodiment.

Further evidence of this is shown in FIGS. 6A and 6B, which illustrate xenon shadowgraphs of a textured glass 600A after a 3-D forming process and a non-textured glass 600B after a 3-D forming process, respectively. As indicated by the uniform shadow in FIG. 6A, the surface of the textured glass 600A is generally free from irregularities. And as shown in FIG. 6B, the non-textured glass 600B includes a number of surface irregularities 606, indicated by the black dots, after 3-D forming, as a result of contamination from the mold.

Figure 7A:
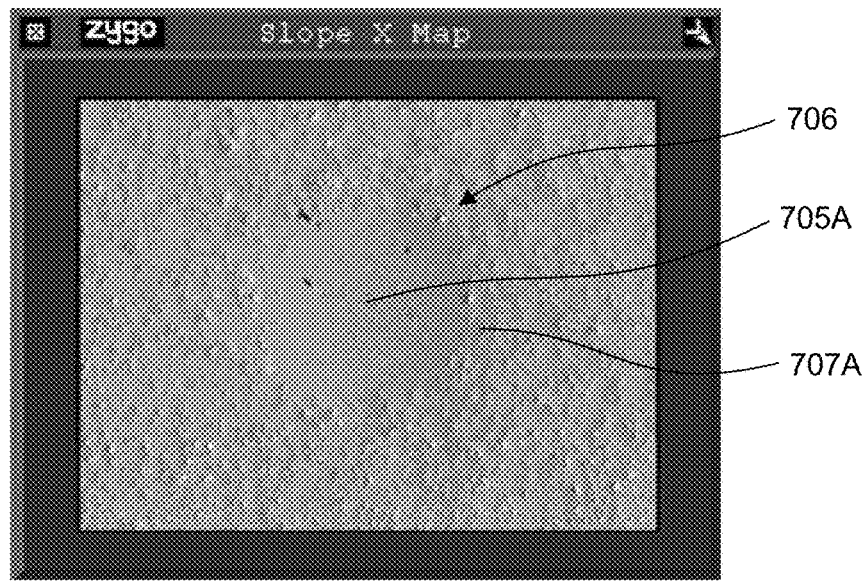
FIG. 7A illustrates a vacuum imprint formed on a non-textured glass.
Figure 7B:
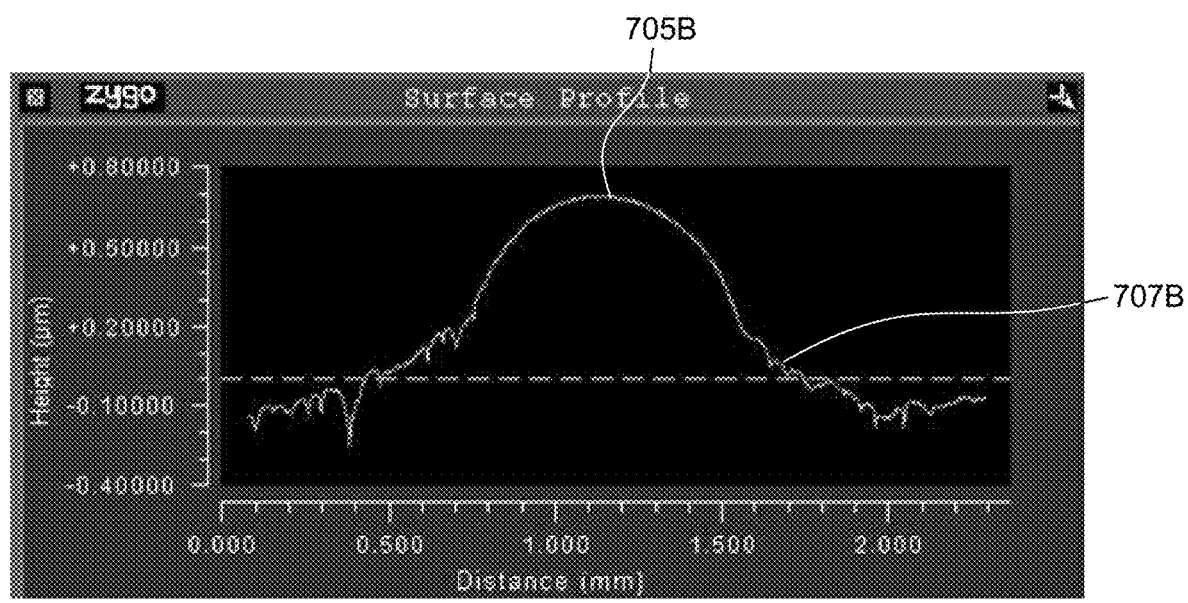
FIG. 7B illustrates a surface profile of the vacuum imprint in FIG. 7A.

FIG. 7A illustrates a Zygo® 7300 Optical Surface Profiler slope map image of a vacuum imprint 706 formed on the mold contact side of a non-textured 3-D glass sample as a result of vacuum pressure placed on the glass during the 3-D forming process. The vacuum imprint 706 has a peak 705A and an edge 707A, which are indicated in FIG. 7B at 705B and 707B, respectively. FIG. 7B is a surface profile graph of the vacuum imprint 706 in FIG. 7A, indicating the height of the vacuum imprint 706 across the surface.

Figure 8A:
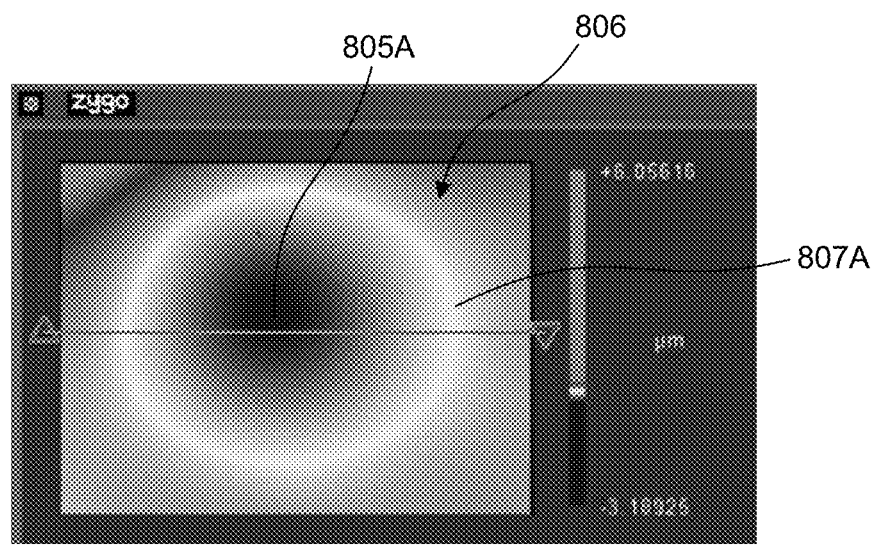
FIG. 8A illustrates a 3-D model image of the air side of the vacuum imprint of FIG. 7A.
Figure 8B:
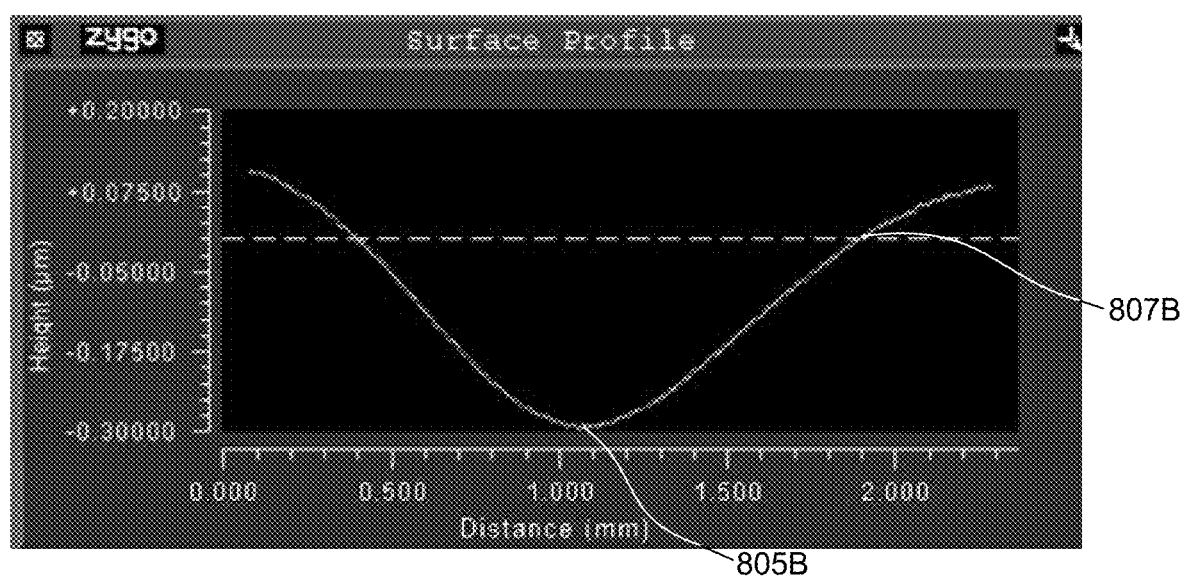
FIG. 8B illustrates a surface profile graph of FIG. 8A.

FIG. 8A illustrates a Zygo® 7300 Optical Surface Profiler 3-D model image of the vacuum imprint 706 in FIG. 7A from an air side of the glass, i.e., the side of the glass that does not contact the mold. The vacuum imprint 806 has a trough 805A that is represented by the dark center area in FIG. 8A and an annular edge 807A that is represented by the lighter ring area in FIG. 8A. FIG. 8B illustrates a surface profile graph across the vacuum imprint 806, with the trough and edge indicated at 805B and 807B, respectively.

Figure 9A:
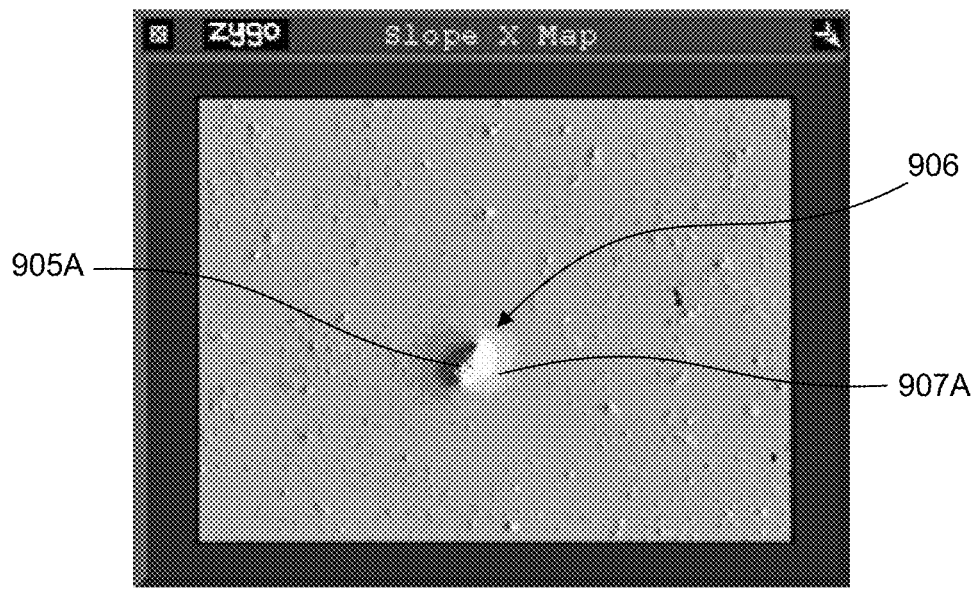
FIG. 9A illustrates a dimple formed on the mold contact side of a non-textured glass.
Figure 9B:
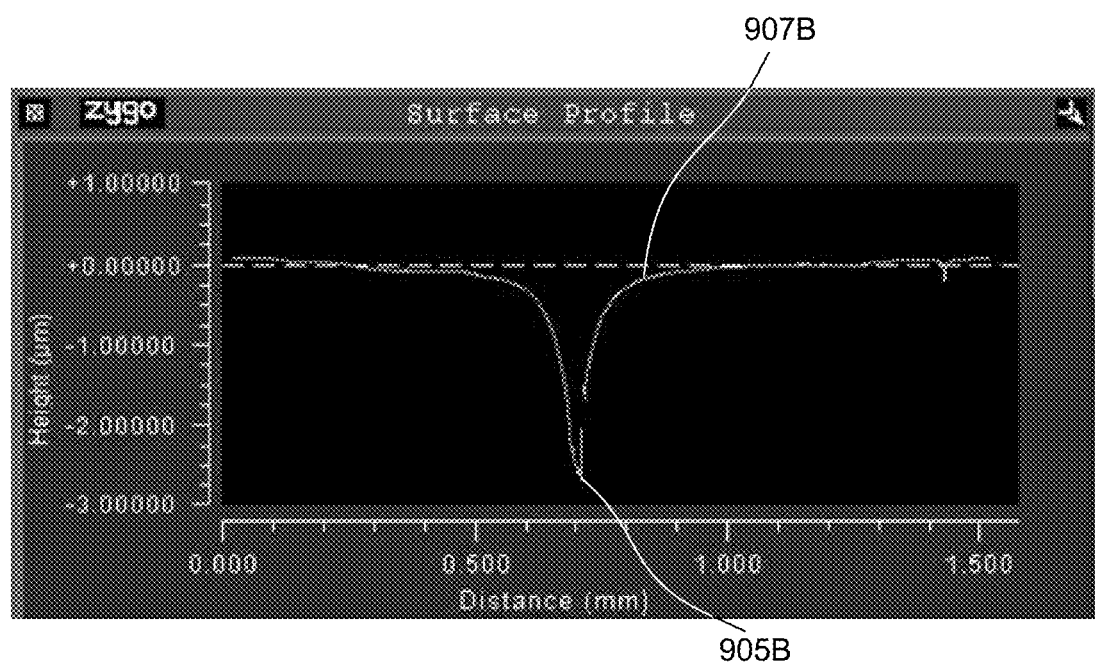
FIG. 9B illustrates a surface profile graph of FIG. 9A.

FIG. 9A illustrates a Zygo® 7300 Optical Surface Profiler slope map image of a dimple 906 formed on the mold contact side of a non-textured 3-D glass sample as a result of contacting the mold, which itself can include surface irregularities. The dimple 906 includes center indent 905A and annular edge 907A, which are represented in the surface profile graph of FIG. 9B by 905B and 907B, respectively.

Figure 10A:
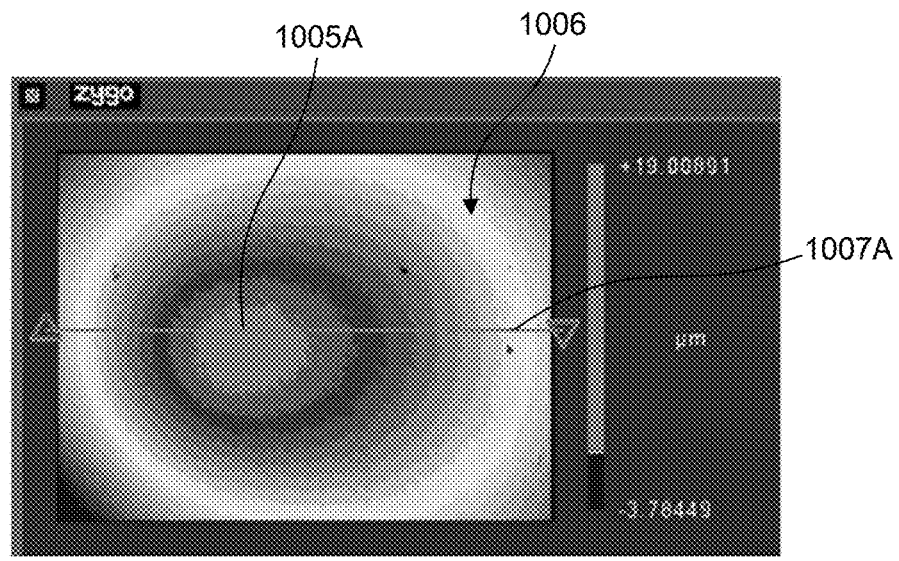
FIG. 10A illustrates a 3-D model image of the air side of FIG. 9A.
Figure 10B:
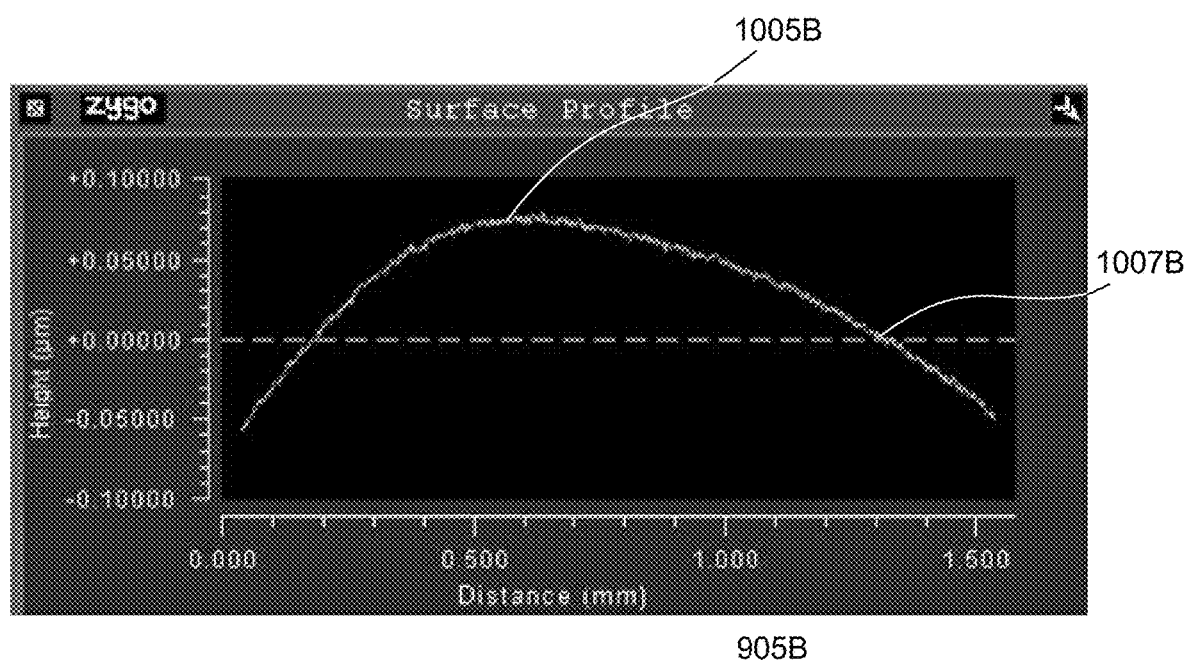
FIG. 10B illustrates a surface profile graph of FIG. 10A.

FIG. 10A illustrates a Zygo® 7300 Optical Surface Profiler 3-D model image of the dimple in FIG. 9A from the air side (i.e., non-contact side) of the glass. Dimple 1006 includes peak 1005A and edge 1007A, which are represented on the surface profile graph of FIG. 10B by 1005B and 1007B, respectively.

The foregoing Figures illustrated surface irregularities caused from 3-D molding of glasses. FIGS. 11 and 12 illustrate a schematic comparison of non-textured and textured glasses, respectively, during a 3-D forming process. In general, glass is 3-D formed at an elevated temperature by contacting a mold. Usually, the mold itself has a certain surface roughness. A mold may also have one or more holes so that a vacuum can be applied in order to 3-D form the heated (i.e., softened) glass-based substrate. In some cases, a vacuum imprint can be formed on the surface of the glass-based substrate at the vacuum hole location. Furthermore, some of the mold material can transfer to the glass-based surface when the glass-based surface contacts the mold surface. These are both unwanted flaws in the glass-based surface that can decrease production yield.

FIG. 11 illustrates process 1100 for forming a 3-D substrate from a non-textured substrate 1110 (e.g., glass or glass-ceramic). Step 1102 shows a non-textured substrate 1110 and a mold 1130. Non-textured substrate 1110 can include a mold contact side 1112 and an air side 1114. Mold 1130 can include a mold surface 1132 that is roughened, a vacuum hole 1134, and an angled portion 1138 that helps shape non-textured substrate 1110. At step 1104, non-textured substrate 1110 can be placed onto mold 1130, which can also be heated, and a vacuum can be turned on to create a 3-D shape of non-textured substrate 1110. When the mold contacts a non-textured glass, it can change the glass surface morphology and roughness, and transfer some mold material to the glass-based surface. The glass-based surface on top of the vacuum can also become deformed. This is shown at step 1106, where once the non-textured substrate 1110 is removed from the mold 1130, (i) the mold contact side 1112 of non-textured substrate 1110 includes a vacuum deformation 1116 caused by the vacuum hole 1134, (ii) mold remnants 1118 transferred from the mold surface 1132 to the non-textured substrate 1110, and (iii) an increased roughness is imparted to mold contact side 1112 of non-textured substrate 1110 from roughened mold surface 1132.

In comparison, FIG. 12 illustrates process 1200 for forming a 3-D substrate from a textured substrate 1210 (e.g., glass or glass-ceramic). Step 1202 shows textured substrate 1210 having a mold contact side 1212 and air side 1214. In some embodiments, mold contact side 1212 can be textured according to the processes described herein. When textured substrate 1210 is placed onto mold 1230 at step 1204, textured substrate 1210 can deform along angled portion 1238 of mold 1230. However, as illustrated at step 1206, when textured substrate 1210 is removed from mold 1230, the mold contact side 1212 of textured substrate 1210 does not include a vacuum deformation or mold remnants. This is because when the mold 1230 contacts the textured substrate 1210, the roughened surface of mold contact side 1212 prevents continuous contact between the mold surface 1232 and mold contact side 1212 of textured substrate 1210. The decreased surface area contact significantly reduces material transfer (i.e., contamination by mold remnants). Also, vacuum pressure on the glass-based substrate at vacuum hole location is reduced because the air flow is not restricted due to the surface roughness of the glass-based substrate preventing fully sealing the glass-based substrate and mold surface, so no significant deformation occurs at the vacuum spot. In addition, the effect of imparting features of roughened mold surface 1232 onto mold contact side 1212 of textured substrates 1210 is reduced or, in some instances, may be prevented. Overall, contamination and deformation of the textured surface is reduced, and its morphology is not significantly influenced by the surface roughness of the mold material.

Figure 13:
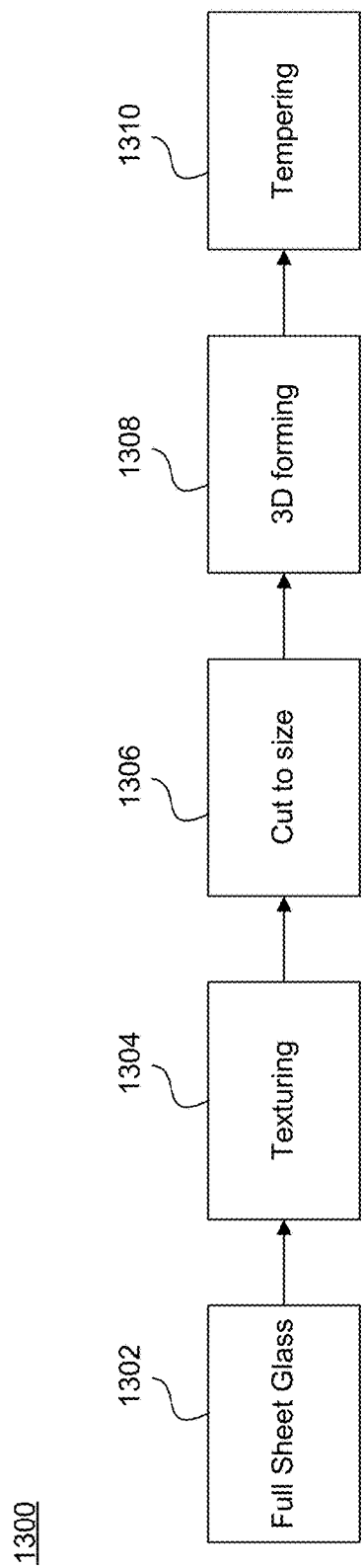
FIG. 13 illustrates a process of forming 3-D textured glass, according to an embodiment.
Figure 14:
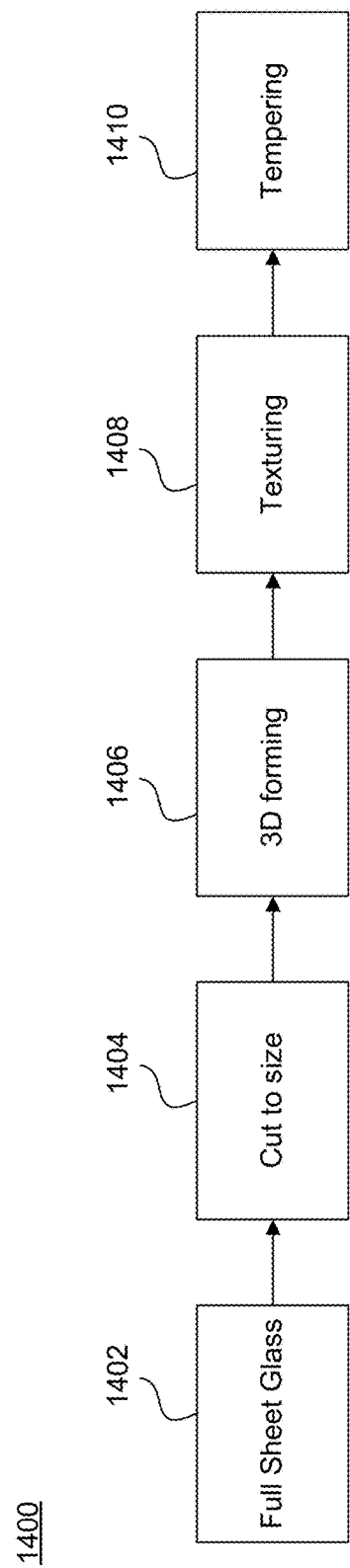
FIG. 14 illustrates a process of forming 3-D textured glass, according to an embodiment.

FIGS. 13 and 14 illustrate process flows for making glass with a 3-D shape and textured surface, according to embodiments. In process 1300 of FIG. 13, texturing of the glass is done before 3-D forming. The full glass-based sheet is textured or roughened, and then cut into smaller pieces before being formed into a 3-D shape. In some embodiments, the glass-based substrate can be tempered, either chemically tempered or thermally tempered. In some embodiments, glass-based substrates are chemically tempered through an ion-exchange process as is known in the art. In the process 1400 of FIG. 14, texturing of the glass-based substrate is done after 3-D forming. The full sheet glass or glass-ceramic is cut into smaller pieces, then 3-D formed, and then textured or roughened. In some embodiments, the glass-based substrate can be chemically or thermally tempered.

More specifically, FIG. 13 illustrates a process 1300 for forming a 3-D textured glass-based substrate, according to a first embodiment. The process begins at step 1302 with a full glass-based sheet. At step 1304, the full glass-based sheet is textured, for example, according to the texturing processes disclosed herein, such as etching. At step 1306, the textured glass-based sheet is cut to a smaller size, for example, into multiple smaller pieces. At step 1308, the smaller glass-based piece is formed into a 3-D shape, for example, using a vacuum mold as shown in FIG. 12. At step 1310, the 3-D textured piece can be tempered.

FIG. 14 illustrates a process 1400 for forming 3-D textured glass-based substrate according to a second embodiment. At step 1402, the process 1400 begins with a full sheet of glass or glass-ceramic. At step 1404, the full sheet of glass or glass-ceramic is cut into smaller size pieces. At step 1406, the smaller size pieces are each formed into a 3-D shape. At step 1408, the 3-D formed pieces are textured. At step 1410, the textured 3-D pieces can be tempered.

There are a number of advantages to process 1300 over process 1400. First, it is easier to texture a full sheet of glass or glass-ceramic than a cut-into-size part. In some embodiments, surface texturing is achieved through a wet etching process, for example, using an etchant containing hydrofluoric acid (HF) and salt containing an ammonium ion ($NH4^+$), potassium ion ($K^+$), and sodium ion ($Na^+$). In some embodiments, glass or glass-ceramic can be textured by a sandblasting and HF etching process. In general, the texturing step requires the glass or glass-ceramic to have a good surface cleanness in order to achieve uniform surface texturing. It is challenging for the texturing process to generate a textured surface with nearly uniform quality area. Areas near the sheet edges tend to have non-uniform surface texture compared to the central area of the sheet. In process 1300, the full sheet of glass or glass-ceramic is first textured. Then, non-quality areas, for example, near the edge can be cut off, and the uniformly textured area can be cut into multiple pieces of smaller size for the subsequent 3-D forming. In process 1400, because the glass or glass-ceramic part is cut and 3-D shaped before texturing, it requires a more careful and tedious texturing process to generate nearly uniform texture on the surface.

Second, it is easier to 3-D form a textured part. As discussed above, in general, glass-based substrate is 3-D formed at an elevated temperature by contacting a mold. Usually, the mold itself has certain surface roughness and the mold may have holes for a vacuum. Some of the mold material can transfer to glass-based surface by contacting the glass-based surface, as shown in FIG. 11, which shows a 3-D forming process for a non-textured glass-based substrate. When the mold contacts the non-textured glass-based substrate, it can change the glass-based surface morphology and roughness, and transfers some mold material (represented by 1118 in FIG. 11) to the glass-based surface. The glass-based surface on top of the vacuum can also get deformed. In comparison, FIG. 12 shows a 3-D forming process for a textured glass-based substrate. When the mold contacts the textured glass-based surface, the roughened surface prevents contiguous contact between the mold and glass-based surface. The material transfer (contamination) is significantly reduced. And during 3-D forming, air flow is not restricted, so no significant deformation occurs at the vacuum spot. Overall, the textured surface does not get contaminated, and its morphology is not significantly influenced by the surface roughness of the mold material.

Figure 15:
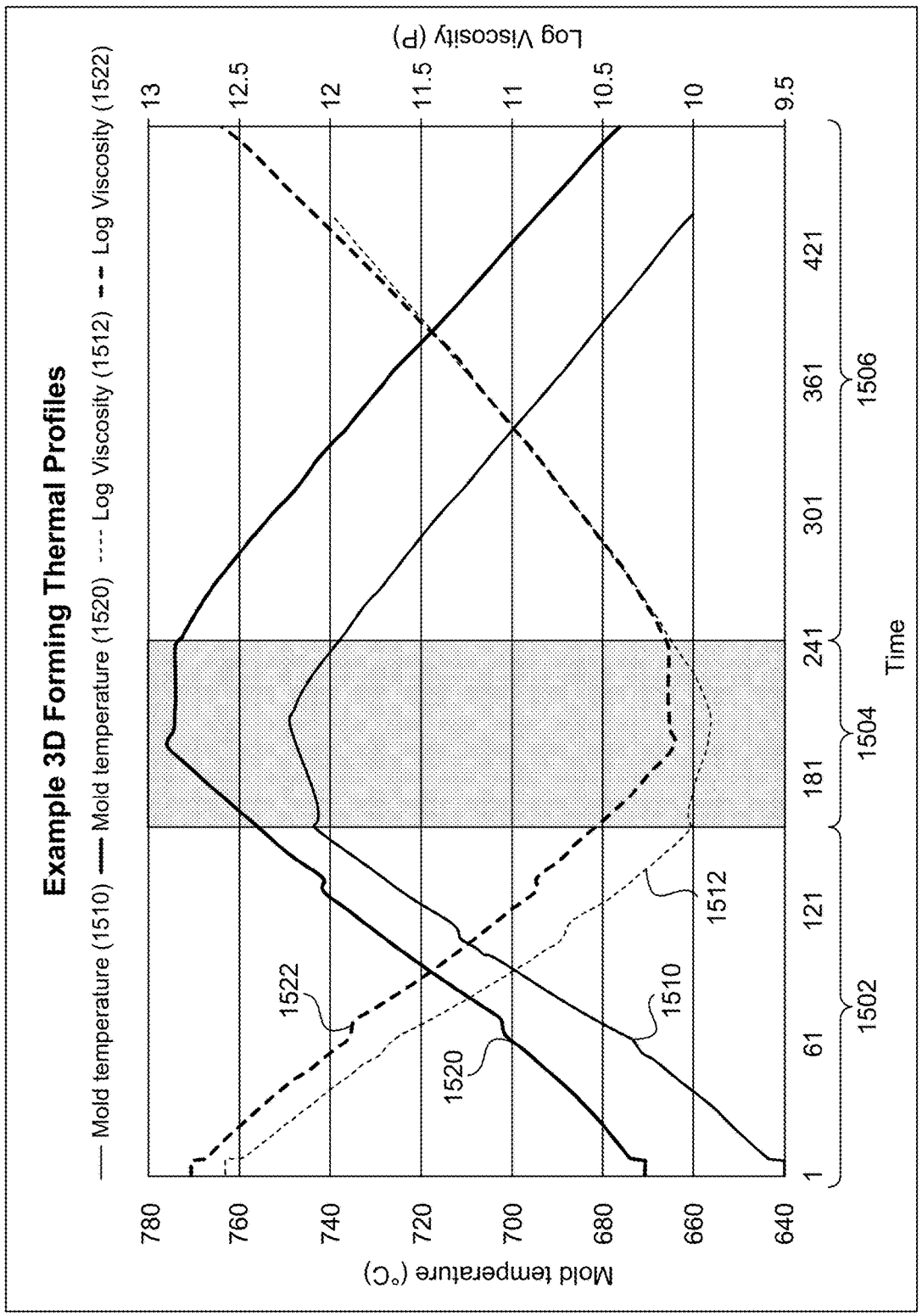
FIG. 15 illustrates a chart of exemplary thermal profiles for forming 3-D textured glass, according to embodiments.

FIG. 15 illustrates two examples of 3-D forming thermal profiles for forming 3-D glass-based substrates. Other 3-D forming thermal profiles are contemplated and within the knowledge of one skilled in the art. In some embodiments, the 3-D forming process can include a heating Stage 1502, a pressure Stage 1504, and a cooling Stage 1506. The plot in FIG. 15 indicates the mold temperature 1510 and a log of the viscosity 1512 for a first sample of glass being formed into a 3-D shape. The mold temperature 1520 and log of the viscosity 1522 for a second sample of glass are also plotted on FIG. 15. The time shown on the x-axis in FIG. 15 is in seconds. During Stage 1502, the glass substrates can be heated to a desired temperature, for example, between about 740-780 C. During Stage 1504, the glass can continue to be heated or the temperature can increase residually. At Stage 1504, pressure can be applied to the glass-based substrate in order to 3-D form the substrate on the mold. For example, a vacuum can be applied to the substrate in order to create the 3-D shape from the softened substrate as a result of the heating. At Stage 1506, the 3-D formed substrate can then be cooled. Once the sample cools, it will maintain its 3-D shape. Depending on the shape geometry and the bend radius, the glass viscosity during forming can be between $10^{11}$ Poise and $10^7$ Poise. In some embodiments, the glass viscosity for 3-D forming the glass-based sheet is $10^{10}$ to $10^8$ Poise. The viscosity may also be within any range having any two of these values as endpoints. Similar benefits such as fewer imprinting defects and press marks on the textured glass surface can be obtained in other forming processes, for example, two mold pressing and pressure forming, because of the reduced contact area and decreased friction between the glass-based surface and mold surface created by increased glass-based surface roughness.

Figure 16:
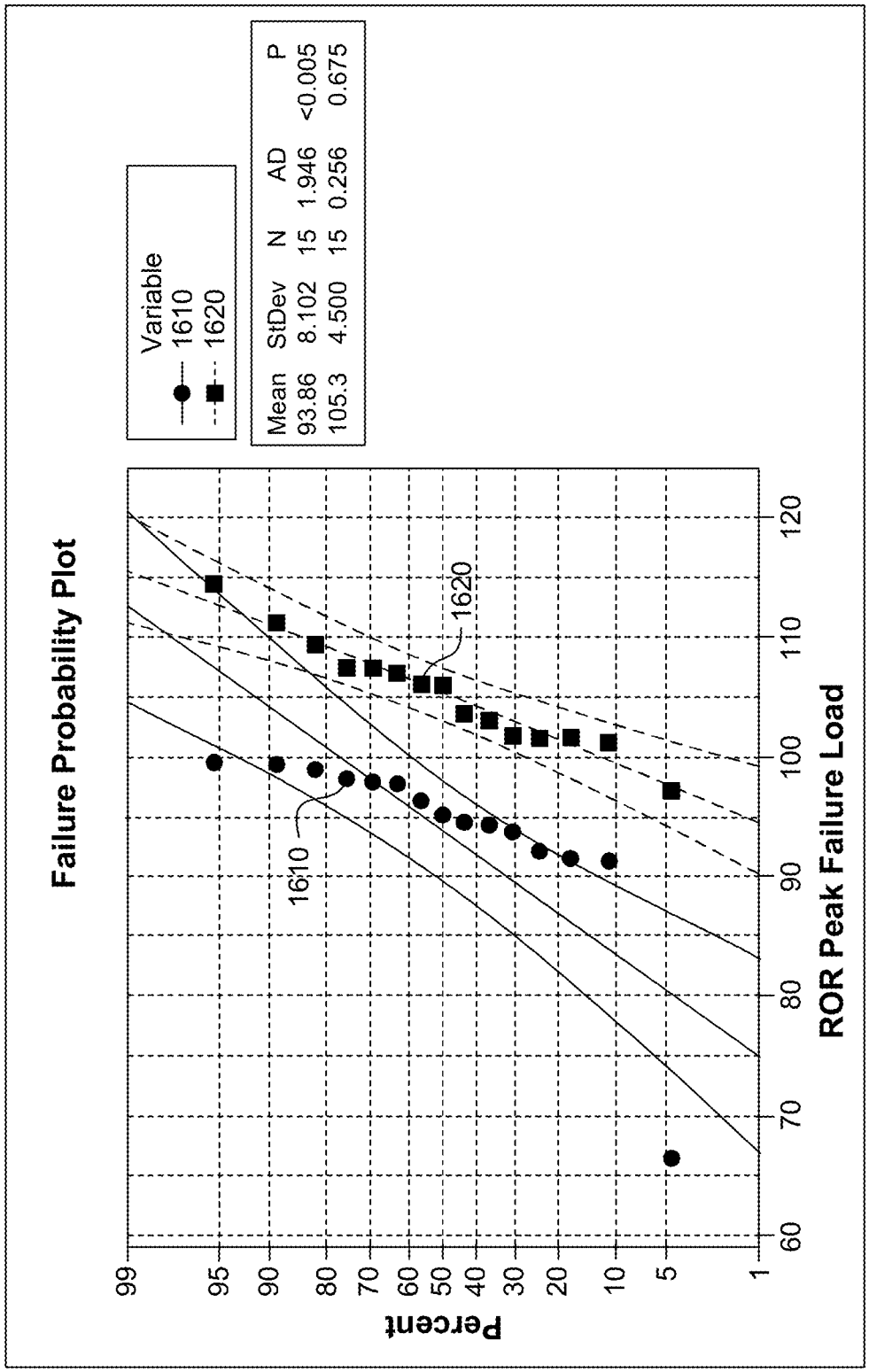
FIG. 16 illustrates a failure probability plot of textured glasses, according to embodiments.

FIG. 16 illustrates a failure probability plot for two examples of glass substrates. A plot of a textured substrate 1610 after standard double-ion exchange is shown along with a plot for a 3-D textured substrate 1620 after standard double-ion exchange. The plot in FIG. 16 illustrates the probability failure for a ring-on-ring ("ROR") peak failure load. As used herein "The Ring-on-Ring Test" is performed according to the ASTM C-1499-15 standard test method for Monotonic Equibiaxial Flexural Strength of Advanced Ceramics at Ambient Temperatures, with the following modifications: (1) samples are subjected to ROR load-to-failure-testing with a 1 inch diameter support ring and a 0.5 inch diameter loading ring; (2) the load is applied at a rate of 1.2 mm/min; (3) testing is performed at room temperature in 50% relative humidity; and (4) the radius of curvature on the rings is 1/16 inch. In some embodiments, the shaping of the glass-based substrate does not significantly change the ring-on-ring failure load such that a ring-on-ring failure load of the glass-based substrate as determined by The Ring-on-Ring Test is within ten percent of the ring-on-ring failure load of a flat (i.e, a substantially planar) glass-based substrate having the same composition and textured surface.

The plots in FIG. 16 illustrate the impact of 3-D forming on mechanical performance. The similar slopes of the plots 1610 and 1620 in FIG. 16 indicate that the surface strength of the textured surface is preserved through the 3-D forming process. This suggests that a textured surface helps prevent flaw formation in the 3-D forming process.

Figure 17B:
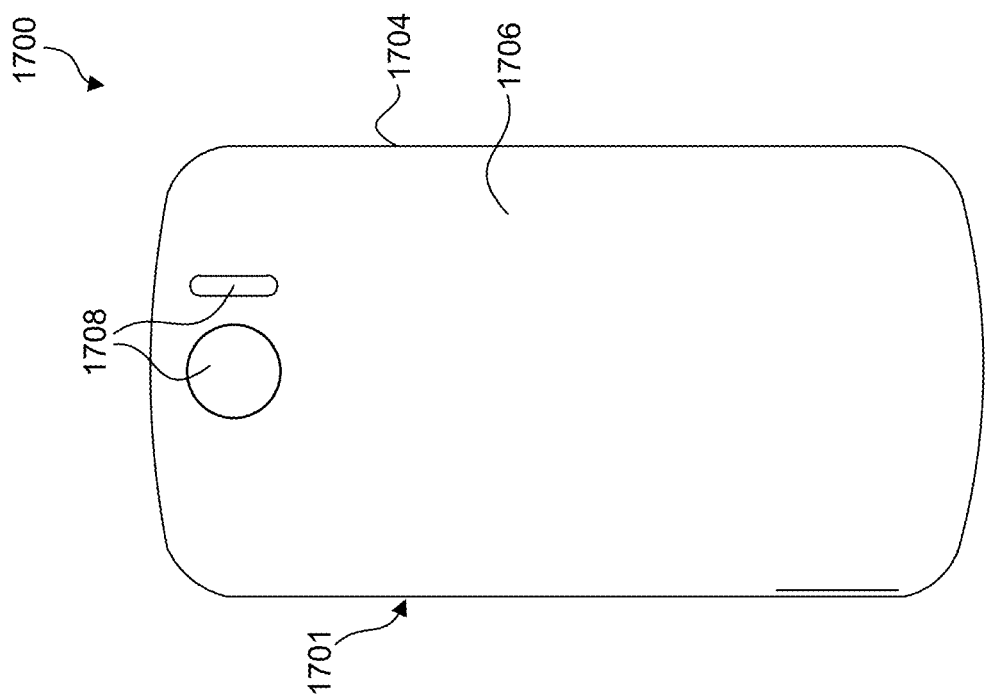
FIG. 17B illustrates a rear view of an electronic device, according to an embodiment.
Figure 17A:
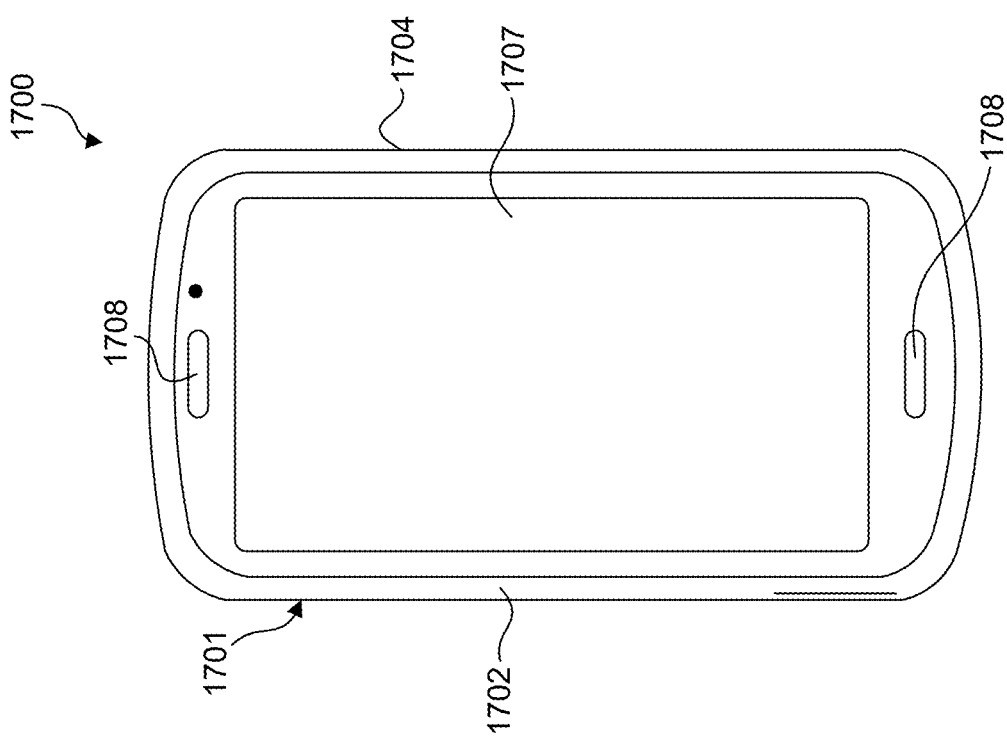
FIG. 17A illustrates a front view of an electronic device, according to an embodiment.
Figure 18A:
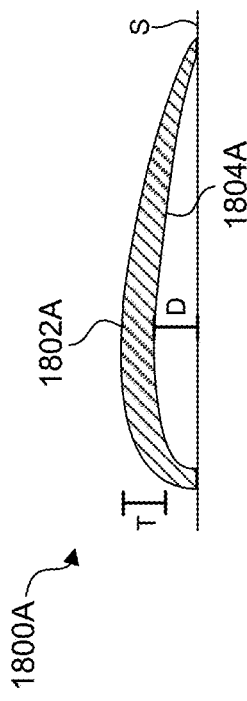
FIGS. 18A-18D illustrate cross-sections of exemplary textured 3-D glass shapes, according to embodiments.
Figure 18B:
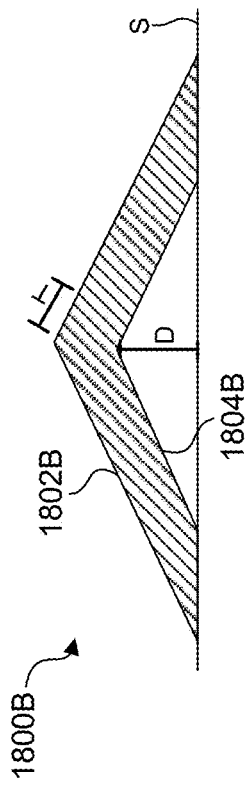
Figure 18C:
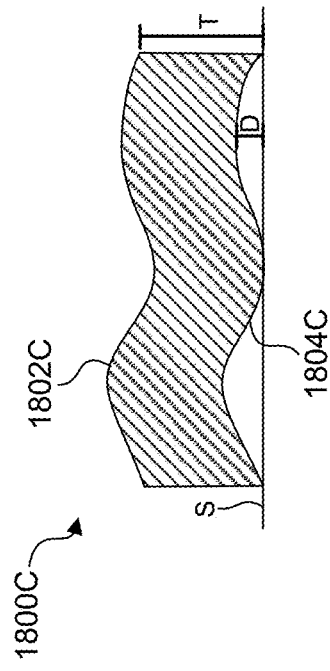
Figure 18D:
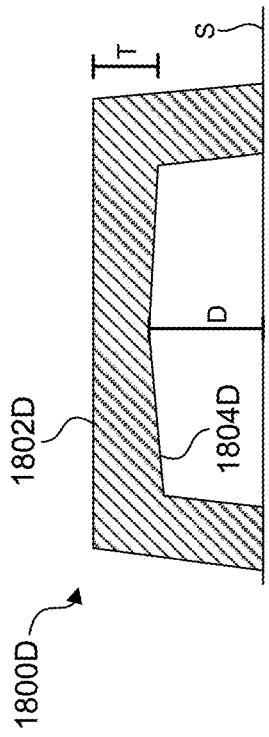

FIGS. 17A and 17B illustrate an electronic device 1700, according to an embodiment. In some embodiments, electronic device 1700 can include a housing 1701 having a front surface 1702, edges 1704, and rear surface 1706; electrical components (not shown) that are at least partially inside or entirely within the housing and including at least a controller, a memory, and a display at or adjacent to the front surface of the housing; and a cover substrate 1707 at or over the front surface of the housing such that it is over the display. In some embodiments, front surface 1702 and/or rear surface 1706 of housing 1701 of electronic device 1700 can have one or more holes 1708. In some embodiments, the glass-based substrates described herein can form the front surface 1702 and/or the rear surface 1706 housing 1701 of electronic device 1700 and/or cover substrate 1707. In some embodiments, electronic device 1700 can be a smart phone or other portable electronic device, for example, but not limited to a PDA, tablet, cellular phone, or laptop computer. In some embodiments, the textured substrate can include one or more hole 1708, for example, for a speaker, a microphone, a camera lens, and/or a flash of electronic device 1700.

FIGS. 18A-18D illustrate example embodiments of cross-sections for 3-D formed substrates according to the processes described herein. The 3-D substrates 1800A-D (i.e., 3-D glass) can include a textured surface 1802A-D, a non-textured surface 1804A-D, and a thickness T. Although surface features are not shown, textured surfaces 1802A-D can be textured according to any of the processes as described herein. Other shapes for textured 3-D formed substrates are also contemplated. FIGS. 18A-18D also illustrate a flat surface S upon which 3-D glasses/glass-ceramics 1800A-D rest. As can be seen in FIGS. 18A-18D, each of 3-D glasses/glass-ceramics 1800A-D has at least a portion elevated a distance D above the surface S.

EXAMPLES AND TABLES

Example processes and characteristics of samples of textured and non-textured glass before and after 3-D forming processes are disclosed below. These examples are not meant to be limiting to the disclosure.

Example 1

Preparing a textured surface glass with high haze and roughness levels using chemical etching. Table 3, below, provides details of double-side texturing conditions and results.

Glass: of Composition 1 including, in mol % on an oxide basis 57.43 mol % $SiO_2$; 16.1 mol % $Al_2O_3$; 17.05 mol % $Na_2O$; 2.81 mol % MgO; 0.003 mol % $TiO_2$; 0.07 mol % $SnO_2$; and 6.54 mol % $P_2O_5$ and having Length×Width×Thickness of: 50 mm×50 mm×0.70 mm, or 130 mm×64 mm×0.55 mm.

Before etching, glasses are cleaned by cleanline wash (ultrasound assisted detergent wash).

Chemicals: ammonium fluoride ($NH_4F$); hydrofluoric acid (HF).

Etchants: roughening reagent 1: 6 wt % HF and 15 wt % $NH_4F$.

Polishing reagent: 5 wt % HF.

Process Steps:

(1) Glasses are cleaned before etching.

(2) For single side texturing only: coated one glass surface with etch-resistant film by lamination or inkjet printing.

(3) The cleaned glass pieces or sheets are vertically immersed in a roughening reagent (6 wt % HF/15 wt % $NH_4F$) for 8 minutes at room temperature. Then the roughened glasses are rinsed and cleaned in deionized ("DI") water.

(4) The roughened glass is chemically polished by the polishing reagent for specific time to achieve the desired haze and roughness level.

(5) The polished glass is cleaned by DI water.

(6) For single side texturing only: remove the acid-resistant film and clean the textured glass.

Table 1 shows data for textured and non-textured glass before and after a 3-D forming process. Data includes average surface roughness (Ra) and average waviness (Wa) of the sample. The average waviness a is defined as the arithmetic average of the absolute values of the waviness profile and can be described by the following equation:

$$W_a = \frac{1}{L}\int_L^0 |z(x)|dx.$$

Data on the width and depth of dimples created on the mold side of the sample from the mold surface (and corresponding width and height on the air side) is included. Data on the width and height of vacuum imprints (VI) created on the mold side of the sample from the vacuum hole (and corresponding width and depth on the air side) is also included.

TABLE 1

| Sample | Side | Ra (μm) | Wa (μm) | Dimple Mold Side Width (μm) | Dimple Mold Side Depth (μm) | Dimple Air Side Width (μm) | Dimple Air Side Height (μm) | VI Mold Side Width (μm) | VI Mold Side Height (μm) | VI Air Side Width (μm) | VI Air Side Depth (μm) |
|---|---|---|---|---|---|---|---|---|---|---|---|
| Textured Preform1 | A | 0.91 | 0.16 | — | — | — | — | — | — | — | — |
| | B | 0.91 | 0.15 | — | — | — | — | — | — | — | — |
| Textured Preform 2 | A | 0.93 | 0.15 | — | — | — | — | — | — | — | — |
| | B | 0.89 | 0.14 | — | — | — | — | — | — | — | — |
| Non-textured Preform 1 | A | 0.0002 | 0.0005 | — | — | — | — | — | — | — | — |
| | B | 0.0001 | 0.16 | — | — | — | — | — | — | — | — |
| Non-textured Preform 2 | A | 0.0002 | 0.15 | — | — | — | — | — | — | — | — |
| | B | 0.0002 | 0.14 | — | — | — | — | — | — | — | — |
| Formed 780C - Textured 1 | Mold | 0.84 | 0.13 | — | — | — | — | — | — | — | — |
| | Air | 0.88 | 0.14 | — | — | — | — | — | — | — | — |
| Formed 780C - textured 2 | Mold | 0.85 | 0.14 | — | — | — | — | — | — | — | — |
| | Air | 0.89 | 0.14 | — | — | — | — | — | — | — | — |
| Formed 780C - Non-textured 1 | Mold | 0.01 | 0.03 | 354 | 2.55 | — | — | 360 | 0.94 | — | — |
| | Air | 0.0001 | 0.01 | — | — | 639 | 0.19 | — | — | 250 | 0.51 |
| Formed 780C - Non-textured 2 | Mold | 0.011 | 0.034 | — | — | — | — | 360 | 0.73 | — | — |
| | Air | 0.0002 | 0.025 | — | — | — | — | — | — | — | — |

Example 2

An example of 3-D forming process.

In general, glass is 3-D formed through a molding process at an elevated temperature. The process time depends on the shape, thickness, etc. As shown, for example in FIG. 15, a typical vacuum time is about 60 seconds. The total cycle time for vacuum forming also depends on shape and glass thickness but is typically around 6 minutes. Typically, for glass having Composition 1, the vacuum is triggered when the mold corner temperature reaches about 780-785 C. As shown, for example in FIG. 15, the mold trigger temperature here is lower than 780-785 C for the textured glass samples.

Table 2 provides characterization and visual inspection of textured glass samples of different haze and roughness levels before and after 3-D forming (denoted as preform and formed, respectively). Table 2 provides information for both the textured and non-textured sides, including transmittance haze, average roughness (Ra), the peak-to-valley measurement (PV), and average waviness (Wa). The transmittance haze is measured according to ASTM E430-11 using a transparency meter such as the Haze-Gard meter supplied by BYK-Gardner GmbH, of Geretsried, Germany. The peak-to-valley measurement is the distance between the highest point on the sampled surface to the lowest point on the sampled surface.

TABLE 2

| Type | Description | Transmittance Haze (%) | Ra on Non-textured side (nm) | Ra on textured side (nm) | PV on textured side (nm) | Wa on Non-textured side (nm) | Wa on textured side (nm) | Note |
|---|---|---|---|---|---|---|---|---|
| A | Low haze/low Ra (preform) | 3.54 | 0.39 | 53.21 | 713 | 0.65 | 7.24 | |
| B | High haze/high Ra (preform) | 56 | 0.36 | 567.34 | 6107 | 1.13 | 87.14 | |

TABLE 2-continued

| Type | Description | Transmittance Haze (%) | Ra on Non-textured side (nm) | Ra on textured side (nm) | PV on textured side (nm) | Wa on Non-textured side (nm) | Wa on textured side (nm) | Note |
|---|---|---|---|---|---|---|---|---|
| C | High haze/low Ra (preform) | 66.5 | 0.20 | 120.67 | 1563 | 0.55 | 8.65 | |
| A | Low haze/low Ra (formed) | 3.48 | 8.71 | 46.99 | 490 | 39.31 | 51.54 | Visible imprint and dimple defect |
| B | High haze/high Ra (formed) | 34.7 | 2.97 | 430.17 | 3977 | 57.18 | 119.53 | No visible defect on AG side |
| B | High haze/high Ra (formed) | 52.1 | 2.02 | 536.74 | 5291 | 47.96 | 95.91 | No visible defect on AG side |
| C | High haze/low Ra (formed) | 67.6 | 0.23 | 129.51 | 1707 | 29.35 | 64.46 | Visible imprint and dimple defect |

As discussed above, a textured surface can prevent glass contamination and deformation at the vacuum spot because of the roughened surface. When the textured glasses of different roughness levels were formed (3-D formed according to the protocol in Example 2, above), the low-roughness glasses (Type A and Type C in Table 2) show visible dimples and defects from the AG side, while the high-roughness glasses (Type B in Table 2) do not. The comparison of Type B and Type C glasses (in Table 2) suggests that the formation of defects is driven by roughness but not transmittance haze level. To avoid the surface contamination or defect formation during the 3-D process, a surface roughness (Ra) level of at least 200 nm or above is suggested.

Table 3 provides data for double-side textured glass samples formed according to the process described above in Example 1. The transmittance haze and surface roughness (Ra) were measured using the techniques described above. The transmittance was measured using the Haze-Gard meter. As used herein, the term "transmittance" is defined as the percentage of incident optical power within a given wavelength range transmitted through a material (e.g., the enclosure or portions thereof). As used herein, the "visible spectrum" includes the wavelength range from about 420 nm to about 700 nm.

without departing from the spirit and scope of the present disclosure. The elements of the embodiments presented herein are not necessarily mutually exclusive, but may be interchanged to meet various needs as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

TABLE 3

| Transmittance Haze (%) | Transmittance (%) | Final thickness (mm) | Surface Roughness (Ra) (nm) | Largest Feature (micron) | Process step 1 6 wt % HF - 15 wt % NH$_4$F (min) | Process step 2 5 wt % HF (min) |
|---|---|---|---|---|---|---|
| 109 | 82.8 | 0.699 | 1216 | — | 8 | 0 |
| 104 | 90.8 | 0.676 | — | 18.3 | 8 | 2 |
| 101 | 90.7 | 0.665 | 997 | 22.1 | 8 | 3.1 |
| 95 | 90.5 | 0.652 | — | 25.4 | 8 | 4.5 |
| 91 | 90.9 | 0.646 | — | 28.8 | 8 | 5.8 |
| 88 | 90.9 | 0.633 | — | 30.6 | 8 | 7.1 |
| 82 | 91.1 | 0.618 | 773 | 31 | 8 | 8.4 |
| 78 | 91.3 | 0.605 | — | 34.3 | 8 | 9.8 |
| 70 | 91.4 | 0.592 | — | 35.5 | 8 | 11.1 |
| 60 | 92.3 | 0.571 | — | 39 | 8 | 13.7 |
| 50 | 92.8 | 0.552 | 605 | 45 | 8 | 16.4 |
| 0 | 93.0 | 0.705 | — | — | — | — |

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein The term "or," as used herein, is inclusive; more specifically, the phrase "A or B" means "A, B, or both A and B." Exclusive "or" is designated herein by terms such as "either A or B" and "one of A or B," for example. The indefinite articles "a" and "an" and the definite article "the" to describe an element or component means that one or at least one of these elements or components is present, unless otherwise stated in specific instances.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about."

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

What is claimed is:

1. A process, comprising:
   texturing a first surface of a glass-based substrate to create a textured first surface; and
   after texturing the first surface, shaping the glass-based substrate having the textured first surface into a three-dimensional shape,
   wherein the textured first surface faces a mold surface during shaping and wherein a surface profile of the substrate is non-planar after shaping, and
   wherein texturing the first surface of the glass-based substrate provides the first surface with an average surface roughness (Ra) of 10 nm to 2000 nm.

2. The process of claim 1, wherein texturing the first surface of the glass-based substrate provides the first surface with an average surface roughness (Ra) of 200 nm to 2000 nm.

3. The process of claim 1, further comprising tempering the glass-based substrate after texturing and shaping the glass-based substrate.

4. The process of claim 3, wherein the tempering is chemical or thermal tempering.

5. The process of claim 1, wherein texturing the first surface of the glass-based substrate comprises etching the first surface of the glass-based substrate.

6. The process of claim 1, wherein shaping the glass-based substrate into the three-dimensional shape comprises vacuum-forming the glass-based substrate on a mold.

7. The process of claim 6, wherein vacuum-forming the glass-based substrate on the mold comprises applying a vacuum pressure on the textured first surface.

8. The process of claim 1, further comprising cutting the glass-based substrate to provide one or more substrate portions having an area smaller than the glass-based substrate.

9. The process of claim 8, wherein the cutting is performed after texturing the first surface of the glass-based substrate and before shaping the glass-based substrate into the three-dimensional shape.

10. The process of claim 1, wherein the three-dimensional shape comprises a curve in at least one direction.

11. The process of claim 1, wherein when the non-planar glass-based substrate is at rest on a flat surface, at least a portion of the glass-based substrate is elevated above the flat surface by a distance of at least 1 times the maximum thickness of the glass-based substrate.

12. The process of claim 1, further comprising texturing a second surface of the glass-based substrate.

13. The process of claim 1, wherein the glass-based substrate is glass.

14. The process of claim 1, wherein the glass-based substrate is glass-ceramic.

15. The process of claim 1, wherein texturing the first surface of the glass-based substrate comprises etching the first surface of the glass-based substrate and polishing the first surface of the glass-based substrate.

16. The process of claim 1, wherein a viscosity of the glass-based substrate during shaping is in a range of $10^7$ Poise and $10^{11}$ Poise.

17. The process of claim 1, wherein a viscosity of the glass-based substrate during shaping is in a range of $10^8$ Poise to $10^{10}$ Poise.

18. The process of claim 1, wherein the mold surface comprises one or more vacuum holes, and wherein shaping the glass-based substrate comprises applying a vacuum pressure on the textured first surface to vacuum-form the glass-based substrate on the mold surface.

19. A process, comprising:
   texturing a first surface of a glass-based substrate to create a textured first surface, wherein texturing the first surface increases the average surface roughness of the first surface; and
   after texturing the first surface, shaping the glass-based substrate having the textured first surface into a three-dimensional shape,
   wherein the textured first surface faces a mold surface during shaping and wherein a surface profile of the substrate is non-planar after shaping, and
   wherein shaping the glass-based substrate into the non-planar shape comprises vacuum-forming the glass-based substrate on a mold.

20. The process of claim 19, wherein vacuum-forming the glass-based substrate on the mold comprises applying a vacuum pressure on the textured first surface.

21. The process of claim 19, wherein texturing the first surface of the glass-based substrate comprises etching the first surface of the glass-based substrate.

* * * * *